(12) United States Patent
McCormack

(10) Patent No.: US 6,886,156 B2
(45) Date of Patent: Apr. 26, 2005

(54) DISASSEMBLING OBJECT CODE

(75) Inventor: Marian McCormack, Edinburgh (GB)

(73) Assignee: STMicroelectronics Limited (GB)

( * ) Notice: Subject to any disclaimer, the term of this patent is extended or adjusted under 35 U.S.C. 154(b) by 700 days.

(21) Appl. No.: 09/727,327

(22) Filed: Nov. 29, 2000

(65) Prior Publication Data

US 2002/0010907 A1 Jan. 24, 2002

(30) Foreign Application Priority Data

Nov. 30, 1999 (GB) ............................................. 9928340

(51) Int. Cl.[7] .............................................. G06F 9/45
(52) U.S. Cl. ...................................................... 717/136
(58) Field of Search ................................ 717/105, 130, 717/127–128, 136–139, 141, 147, 159–163; 714/37

(56) References Cited

U.S. PATENT DOCUMENTS

| | | | | | |
|---|---|---|---|---|---|
| 5,005,152 A | * | 4/1991 | Knutsen | ...................... | 717/139 |
| 5,754,759 A | * | 5/1998 | Clarke et al. | .................. | 714/37 |
| 5,819,097 A | * | 10/1998 | Brooks et al. | ............... | 717/141 |
| 5,881,290 A | | 3/1999 | Ansari et al. | ................ | 395/705 |
| 5,946,484 A | * | 8/1999 | Brandes | ....................... | 717/136 |
| 6,021,272 A | * | 2/2000 | Cahill et al. | ................. | 717/147 |
| 6,151,701 A | * | 11/2000 | Humphreys et al. | ......... | 717/130 |

FOREIGN PATENT DOCUMENTS

| | | |
|---|---|---|
| EP | 0 933 699 A2 | 8/1999 |
| JP | 408147155 A * 6/1996 | ............. G06F/9/06 |
| WO | WO 00/22519 | 4/2000 |

OTHER PUBLICATIONS

Noda et al., "Method and system for instruction change/insertion of object program", Jul. 6, 1996 Pub # 08–147155 (machine translation).*
EPO Search Report for GB Application 9928340, Apr. 19, 2000.
Duncan, "The MS–DOS Encyclopedia" *Microsoft Press*, pp. 1004, 1132–33, (1988).

* cited by examiner

*Primary Examiner*—Kakali Chaki
*Assistant Examiner*—Tuan A Vu
(74) *Attorney, Agent, or Firm*—Jenkens & Gilchrist, PC

(57) ABSTRACT

A method of disassembling object code to generate the original source code is discussed, together with a lister for performing the disassembly. The object code has relocation sections associated with some of the section data. For each location in the section data the lister determines if there is an associated relocation instruction and if there is, the lister derives certain additional information concerning the section data. The lister then generates the original source code, including the additional information.

One example of the additional information is an arithmetic expression used to calculate a value in a relocation instruction. The set of relocations associated with the location of the instruction are read in turn by the lister and by using an expression calculator and an expression stack, the original arithmetic expression can be reconstructed.

21 Claims, 10 Drawing Sheets

DISASSEMBLING OBJECT CODE

FIELD OF THE INVENTION

The present invention relates to disassembling object code to generate the source code from which the object code was derived.

BACKGROUND TO THE INVENTION

It is known practice to develop large and complex computer programs by developing a number of small program modules which, for example, perform a single discrete function and subsequently joining all of these small program modules together to form the complete, single required program. This is advantageous as a number of modules may be developed in parallel and development and testing of the individual, smaller modules is considered to be much easier.

The modules are generally written in source code which is normally a high level language which can be generated by a human and which is in a human readable form. An assembler/compiler reads each source code module and assembles and/or compiles the high level language of the source code module to produce an object code module. The assembler also generates a number of relocations which are used to combine the object code modules at link time in a linker. A linker acts to combine a number of object code modules to form a single executable program.

It is known for the linker to modify parts of the individual program modules during linking in order to optimise the operation and/or performance of the final linked program. This optimisation is not possible before linking as information from other program modules is often required. To enable the linker to perform such optimisation, relocation instructions are included in each program module.

The ELF (executable linking format) standard defines a convention for naming relocations belonging to a given section, e.g. rela.abc is relocation section of section abc. Standard relocations under the ELF format allow an offset in section data to be defined where patching is to occur and a symbol whose value is to be patched. A type field also exists which is used to describe the appropriate method of encoding the value of the symbol into the instruction or data of the section data being patched.

When performing testing and/or debugging operations it is known to use a lister. A lister takes an object code sequence as an input and displays a number of files containing useful information in a humanly readable form. One useful piece of information is the original source code listing. To produce this, the lister implements a conversion process known as disassembling. The source code is useful as machine readable object code is represented simply as hexadecimal numbers and is therefore extremely difficult, if not impossible, for a human operator to read. A further use of the lister is that it is possible to check that the correct variables are being used for a particular program operation. A lister may be used for any object code sequence. This could be, for example, individual object code modules, executable programs (after linking) or library files.

With known disassembly techniques, it is often the case that an instruction in the original source code is expressed in terms of an operand having a value, the value being derived from an expression formed from a number of terms. A simple example would be the instruction "BRA((FOO-$)-x>>1)" where FOO is a label, the value of which is unknown at the time of assembling. The value of FOO would be provided during linking of the program modules. When known listers convert this instruction in its object code form back into source code it is only possible to provide the final value of the expression, so in the example above the output from the list would be "BRA Y", Y being equal to the value of the expression ((FOO-$)-x>>1). This is inconvenient during testing or debugging as if an error occurs it is not possible to determine if the value of the original variable was incorrect or if an error has occurred elsewhere.

Another problem with existing disassembly techniques is as follows. In order to generate object code sequences from source code modules, an assembler reads source code instructions in the source code sequence, and also acts on so-called assembler directives in the source code module. The assembler directives act to assist or control the conversion of the source code instructions to an object code sequence. With conventional disassembly techniques, when the source code is generated from the object code sequence, these assembler directives are not generated. Thus, it is not possible to assess whether or not an error has occurred in a directive itself rather than in the source code, or whether the disassembled source code is the same as the original source code which itself makes it more difficult to locate any incorrect code.

It is an aim of embodiments of the present invention to provide improved disassembly techniques which mitigate against the problems identified above.

SUMMARY OF THE INVENTION

According to one aspect of the present invention there is provided a method of generating a source code listing from an object code sequence comprising section data including a plurality of program instructions, said section data having associated therewith a relocation section including at least one relocation instruction which is used at link time to modify the object code sequence to generate an executable program, the method comprising: for each location in the section data determining if that location in said section data has a relocation instruction associated with it; reading said associated relocation instruction and deriving from the relocation instruction additional information concerning said section data; and generating the source code for that location in the section data and displaying said source code with said additional information derived from the relocation instruction.

The object code sequence can form part of an object code module which also contains the relocation instructions, or alternatively can be a final executable program where the relocation instructions available in the executable program (i.e. the user has not specifically removed them at link time). The object code sequence can also be a library file module.

Another aspect of the invention provides a lister for generating a source code listing from an object code sequence comprising a plurality of program instructions, at least one of said program instructions having a relocation instructions associated with it, the lister comprising: an instruction reader for reading each said program instruction; a relocation reader for reading said relocation instructions; means for determining for each program instruction whether there is an associated relocation instruction; and a disassembler module for disassembling said program instructions received from said instruction reader to generate source code and for disassembling additional information received from said relocation instruction wherein said source code and said additional information can be displayed in human readable form.

In this context, a relocation instruction can be associated with the program instruction if it identifies an offset within the sequence at which the instruction is located, or if it is associated with the data byte in the instruction.

For a better understanding of the present invention and to show how the same may be carried into effect, reference will now be made by way of example to the accompanying drawings, in which:

BRIEF DESCRIPTION OF THE DRAWINGS

FIG. 7b is an illustration of the reconstruction of one of the arithmetical operations shown in FIG. 7a;

DESCRIPTION OF THE PREFERRED EMBODIMENT OF THE INVENTION

Figure 1:
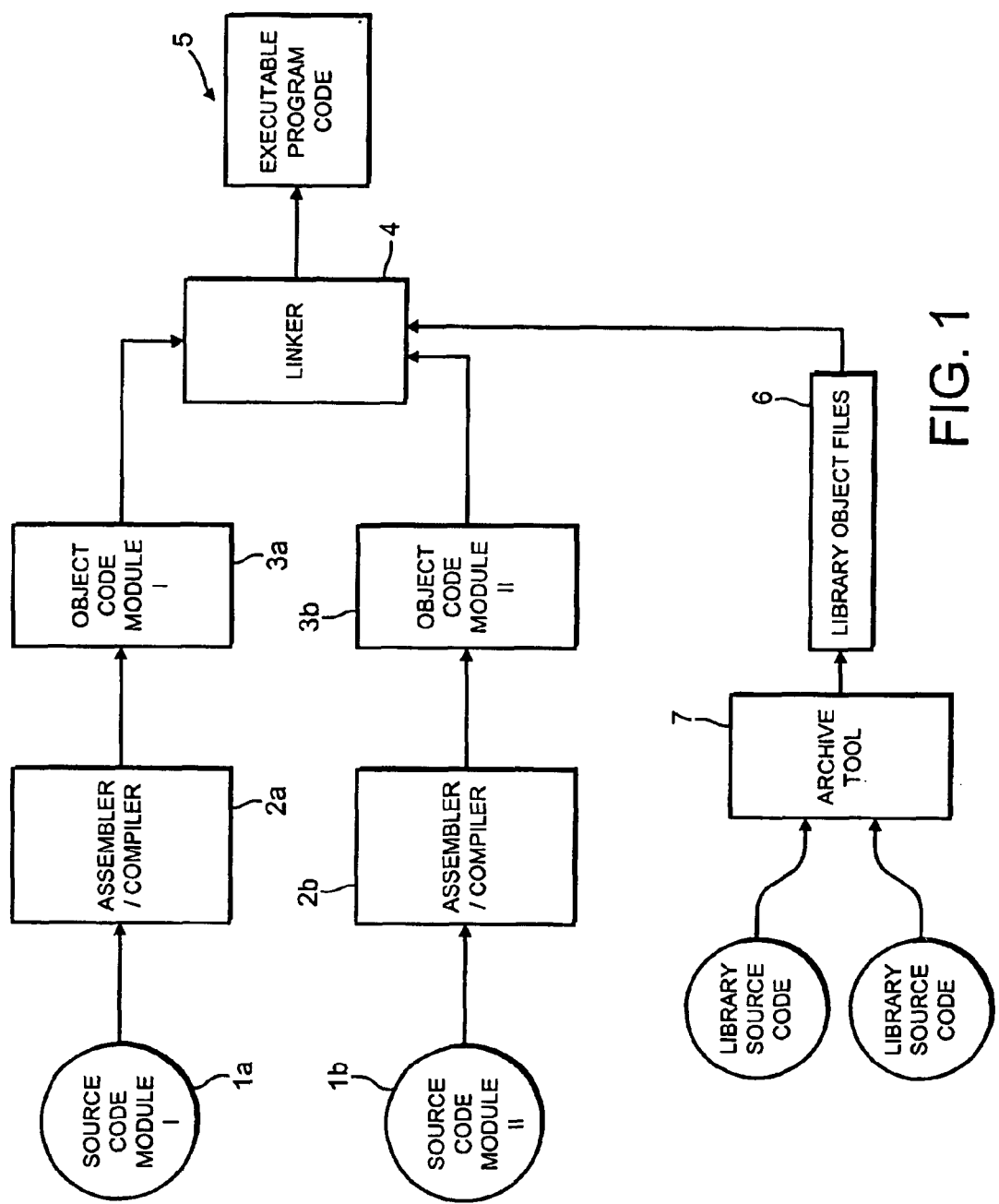
FIG. 1 is a block diagram of the generation of executable program code.

With reference to FIG. 1, a system for linking a number of program modules to form a single executable program is shown schematically. A number of program source code modules 1a,1b, each module written in a high level language is provided. The particular high level language used for each source code module may vary from module to module, or alternatively all of the program source code modules may be written in the same high level language. Each source code module 1a, 1b, is input to a respective assembler/compiler 2a,2b which assembles and/or compiles the high level language of the source code module to produce an object code module 3a,3b.

Each assembler generates an object code module including sets of section data. Each set of section data may have a set of relocations generated by the assembler to describe how the section data is to be patched so as to render it compatible with other section data to form the program 5. These relocations are generated by the assembler. Section data comprises a plurality of code sequences executable in the final program, and data values to be accessed by the executing program.

To achieve this the assembler acts on assembler directives and instructions which are present in the source code module or in the assembler.

Each object code module 3a,3b is the low level language equivalent to each respective source code module 1a,1b, the low level language being a language which is directly readable by a target computer into which the final resulting single executable program is to be loaded. It will be appreciated that a single assembler/compiler could be used to sequentially convert a number of source code modules to respective object code modules.

Each object code module 3a,3b, is passed to a linker 4. Object code modules may be stored in libraries, such as the library 6 in FIG. 1, placed under the control of an archive tool 7. Access to these object code modules by the linker 4 is explained later. The linker combines all of the respective object code modules 3a,3b to produce single executable programs, still in the low level language suitable for the target processor into which the program is to be loaded.

Figure 2:
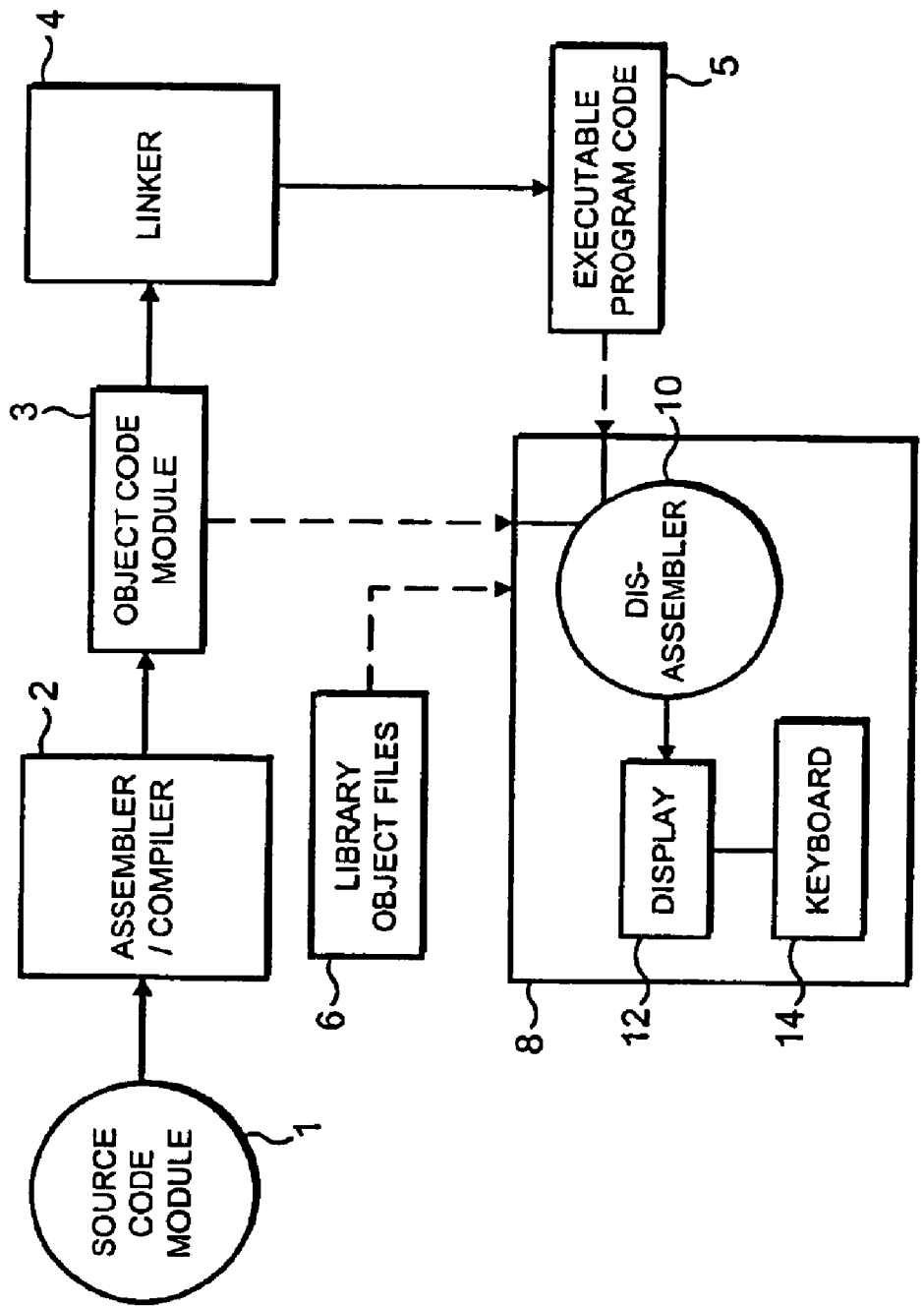
FIG. 2 is a block diagram illustrating the function of a lister.

FIG. 2 shows schematically the system of FIG. 1 in combination with a lister. For the sake of clarity only a single source code module 1 and corresponding assembler/compiler 2 are shown. As described in relation to FIG. 1, each source code module 1 gives rise to an object code module 3. For testing or debugging purposes the object code module 3 may be input to a lister 8. One of the functions of the lister 8 is to disassemble the executable sections of the object code module using a disassembler program 10 to produce source code in the original high level language. The listed source code maybe displayed on the display 12 or stored as a particular file <file name> which can be printed out if needed. The operations of the lister are controlled by a user through a keyboard 14. It is clear that a mouse or other user interface system could be used. As well as acting on the object code modules 3, the lister 8 can act on the complete executable program code 5 produced by the linker or on library object files 6.

The term "relocation instruction" used in the text denotes relocations which act on an object code sequence to rearrange it and modify it at link time. Conventionally a relocation implements the patching of section data or instructions with (encoded versions of) symbols. However it has recently been proposed to introduce further types of relocations, referred to as special relocations. The lister of embodiments of the present invention is suitable for use with both these special relocations and previously known conventional relocations. Although examples of these special relocations are discussed herein to facilitate a full understanding of embodiments of the present invention, a more complete discussion is provided by the applicant's United Kingdom Patent Application No. 9920914.8.

Figure 3:
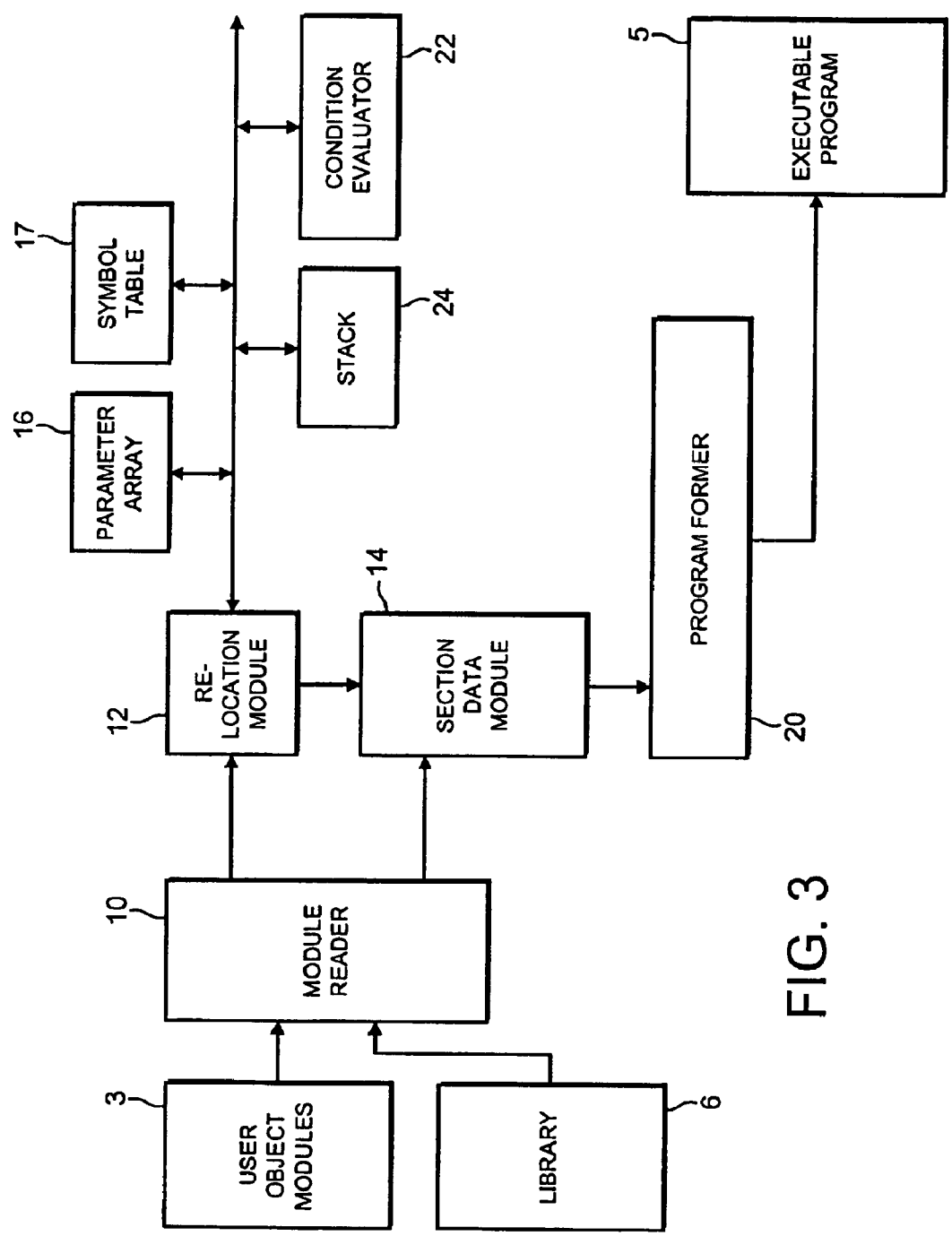
FIG. 3 is a block diagram illustrating the main components of a linker.

In order to fully understand the present invention, an understanding of some special relocations will first be given in conjunction with their use at link time in a linker. FIG. 3 illustrates schematic blocks explaining the functionality of a linker. The linker comprises a module reader 10 which reads a set of incoming object files as user written code modules and library object files from the library 6. A relocation module 12 reads the relocations in the object code module. A section data module 14 holds section data from the object code module and allows patching to take place in response to relocation instructions in the object code module interpreted by the relocation module 12. The relocation module can also interpret special relocations and apply these to the section data held in the section data module 14. A program former 20 receives sequences from the section data module 14 and forms the executable program 5 which is output from the linker 4. The linker also includes a condition evaluator 22 which operates in conjunction with a stack-type store 24. The condition evaluator reads the value of the top entry of the stack 24.

The linker also implements a parameter array 16 and a symbol table 17.

The basic operation of forming an executable by a linker is summarised below. The basic operation comprises:
1. copying sections from input modules to same-name sections in the output executable, and
2. patching sections following the relocations in their corresponding relocation sections.

Figure 4:
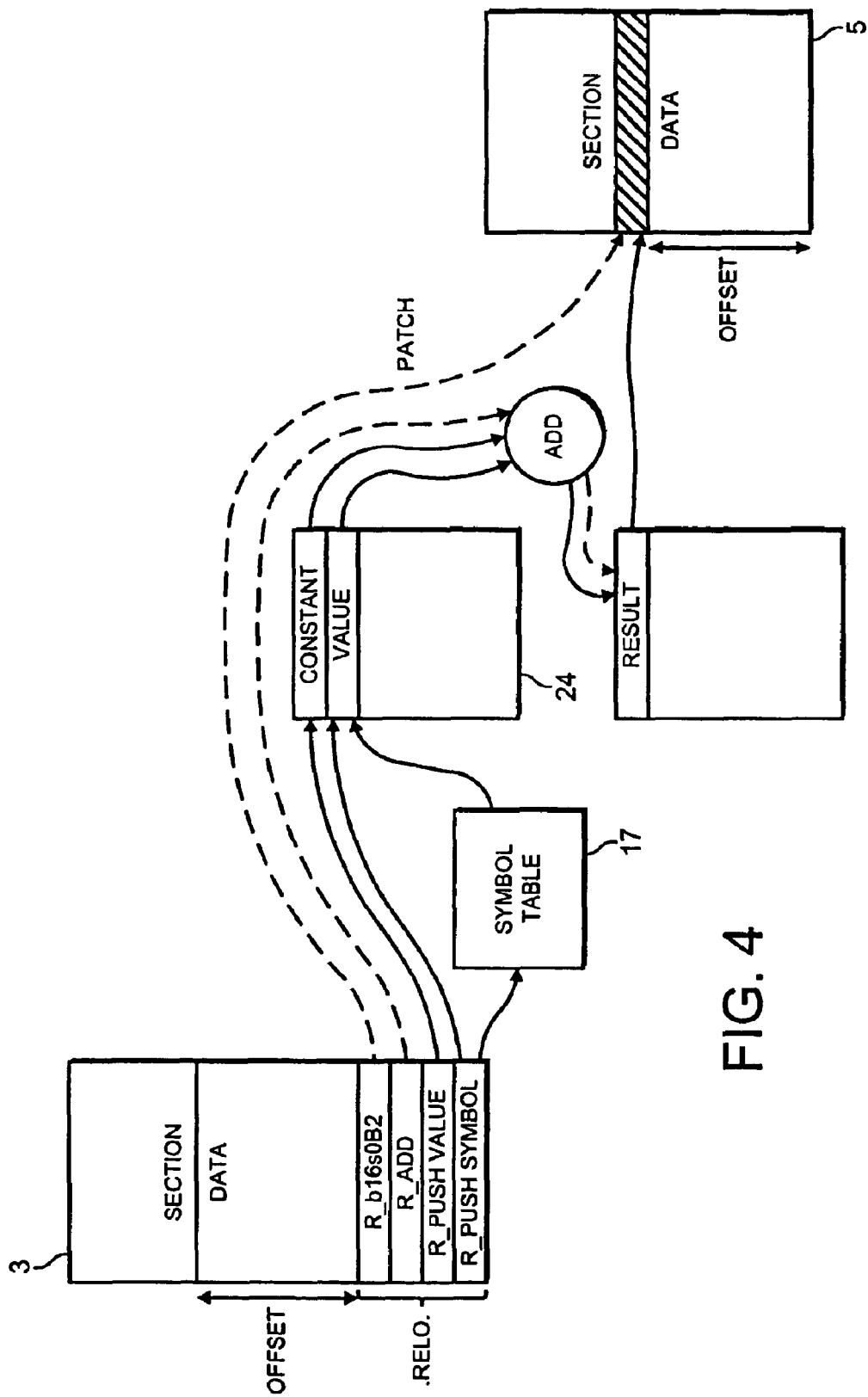
FIG. 4 is a schematic diagram illustrating the function of relocations for implementing arithmetical operations using a stack.

A first set of relocations allows arbitrary calculations to be passed to the linker which are performed using a general purpose stackbased calculator. These relocations allow the value of symbols and constants to be pushed onto the stack and a designated manipulation performed. A first example of such a relocation is given below with reference to FIG. 4.
Patch Symbol Plus Addend on 16 Bit Target Integer This could be accomplished by the following ordered sequence of relocations. The effect of the sequence is illustrates schematically in FIG. 4. FIG. 4 illustrates section data and its accompanying set of relocations forming part of an object code module 3. The relocations will be read in order from the bottom in FIG. 4. The listed relocations are:

R__PUSH symbol /* relocation to push value of symbol on stack */
R__PUSH value /* relocation to push constant value on stack */
R__ADD /* pop top two values off stack add them and push result back */
R__b16x0 B2/patch the value popped from the top of stack into the section data, 16 bits are to be patched, starting at bit 0, in target object two byte wide */ all with the same offset (the offset of the integer to be patched in the section). The result of the patch is shown in the section data which forms part of the executable program 5.

The above relocations are implemented as described in the following with reference to FIGS. 3 and 4. The section data and relocations are read by the module reader 10. The section data is applied to the section data module 14 and the relocations are applied to the relocation module 12. The relocation module considers the first relocation, in this case R__PUSH symbol and acts accordingly to read the required value of the identified symbol from the symbol table 17 and push it onto the stack 24. The subsequent relocations are read, and the necessary action taken with respect to the stack as defined above. Finally the last bit relocation R__b16x0B2 patches the final result value from the stack 24 into the 16 bit target integer. This patched section data is held in a section data module 14 ready for inclusion in the final program at the program former 20 unless, of course, some later relocations make further modifications prior to completion of linking.

Taking now a second example, consider the high level language source code instruction:

SHORI #FOO+(2/(BAR*4)), R1

Where FOO and BAR are both symbols whose values are not known at the time of assembly, for example because they have been defined in other modules.

When this expression is processed by an assembler module the following sequence of relocations is written into the relocation section .relo.xxx associated with the section data section.xxx in the object code module:

R__PUSH FOO
R__PUSH 2
R__PUSH BAR
R__PUSH 4
R__MUL
R__DIV
R__ADD

Each relocation identifies the offset of the main instruction in the section data. The relocations, which are processed at link time, allow the original instruction to be rewritten in a more efficient manner as SHORI<expr>, R1. Due to the sequence of relocations the expression <expr> will be replaced at link time with the calculated value O resulting from the above stack-based calculations. Thus, when the object code expression is processed by a lister of a known type the expression would merely disassemble as shown below:

SHORI #O, R1.

The expression has been disassembled as a single value O, with any information concerning the variables FOO or BAR being lost. As previously discussed, this is disadvantageous for performing testing or debugging operations.

A further example of relocations are conditional section relocations. It is often the case that a number of alternative sequences of operations will be appropriate at a particular point within a program module, the most appropriate sequence to use being dependent on the value of a variable or expression. Normally the required value will not be known until the modules are linked to form a single executable program. Hence all the alternatives are included in the assembled module and at link time those sequence not requires are deleted.

A method of conditionally including one sequence out of a number of alternatives in the section data will now be described with reference to FIGS. 3 and 5. The assembler 2 acts on Conditional Assembler directives to generate special relocations which instruct the linker to conditionally delete unwanted section data.

Figure 5:
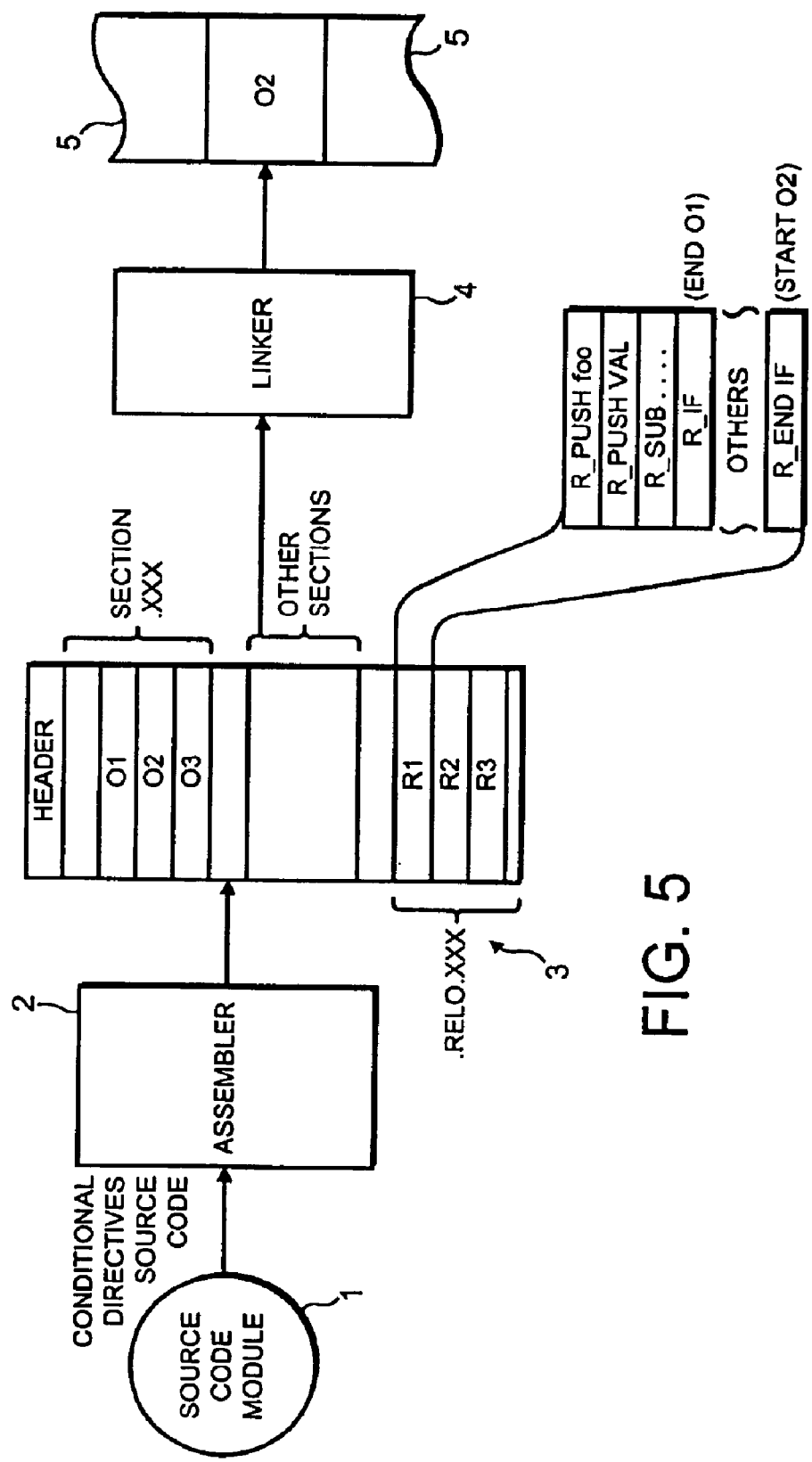
FIG. 5 is a schematic diagram illustrating the function of conditional relocations.

FIG. 5 shows how a resulting object module comprises a set of sections, each section comprising a plurality of code sequences O1,O2,O3 each having a relocation section R1,R2,R3 generated by the assembler. The section data .xxx is shown in FIG. 5 with its relocations R1,R2,R3 in the relocation section .relo.xxx. The relocation bracket between them R__IF and R__END IF relocations to denote the respective offsets defining the code sequences in the section data. An example sequence is illustrated in FIG. 5. The relocation sections are read by the relocation module 12 of the linker 4 to determine how to patch the section data to form a program. According to this embodiment relocation sequences are included in the relocation section associated with each code sequence in the section data to denote that a sequence may be conditionally deleted in the program depending on the top of stack value determined by the previous stack manipulations done by the linker. These relocations compute the conditions to be evaluated, using the symbols or values in the section data.

In FIG. 5, code sequences O1,O2,O3 are alternative sequences for possible deletion in the final module. Thus, the final executable program 5 might include sequence O2 only, sequences O1,O3 having been deleted by the linker because of the relocations R1,R3. In that case, sequence O2 has been "patched" (i.e. not deleted) using relocations in R2.

At link time the relocation module 12 makes multiple passes over the section's relocations recording which conditional passages are included. These are held in the section data module 14 while the condition evaluator 22 evaluates the condition by examining the top of stack. The conditions for inclusion are based on the values of symbols and, since some of these will be forward references to labels in the same section, the result of a given conditional expression may change on the next pass. For this reason multiple passes are required until no more changes are needed.

In order to support the conditional section relocation, a number of new Assembler Directives are required as follows. These cause certain special relocations to be issued as described later:

R_PROC

Marks the start of a block of section data which forms a procedure and defines the entry point of the procedure.

R_ENDPROC

Marks the end of a procedure. There must always be a matching R_ENDPROC relocation to a R_PROC relocation and for any given procedure they must reside in the same physical assembler source file.

LT_IF expr

Marks the start of a block of section data to be conditionally deleted. The condition is that expr should evaluate non-zero. The assembler issues stack manipulation relocations as discussed above to push expr on the linker stack 24 and an R_IF relocation.

LT_ELSE

Marks the start of block of section data to be conditionally inserted/deleted. The condition is the previous LT_IF at the same level of nesting evaluated as zero. The assembler issues an R_ELSE relocation.

LT_ENDIF

Marks where normal linker processing re-starts after an LT_IF/LT_ELSE directive. The assembler issues an R_ENDIF relocation.

The following are the special relocations used to support conditional section data deletions, which are issued by the assembler responsive to the conditional Assembler Directives.

R_IF

Causes the top entry to be popped from the linker's stack of values. If the value is zero then section data is skipped and the succeeding relocations are ignored until R_ELSE/R_ENDIF is encountered. If the value is non-zero then relocations are processed and instructions are not deleted until R_ELSE/R_ENDIF is encountered.

R_ENDIF

Defines the end of the relocations subject to the R_IF relocation, and of section data to be conditionally deleted subject to the R_IF relocation.

R_ELSE

If this is encountered while section data is being taken then section data is skipped and the succeeding relocations are ignored until R_ENDIF is encountered. If encountered while skipping due to R_IF then relocations are processed and instructions are no longer deleted until R_ENDIF is encountered.

Thus, the top of stack can be used for conditional linker relocations. For example, to include section bytes if a symbol has more than 8 bits we could use:

R_PUSH symbol

R_PUSH 0xffff_ff00

R_AND (the above relocations all have the address field r-offset set equal to the start of the section bytes to be conditionally included).

R_ENDIF (with the address field r_offset set equal to end of section bytes to be included+1)

(R_ENDIF is discussed later)

An example of a source code sequence with Assembler Directives is given below.

IMPORT BAR i) PROC FOO

NOP

NOP ii) LT_IF 1

MOVI #2,R2 iii) LT_ELSE

MOVI #3,R3

IV) LT_ENDIF

NOP

NOP

FOO:MOVI #1,R1 v) ENDPROC

The items I) to v) are Assembler Directives.

Listers of a known type are not able to generate assembler directives from the source code and thus they are not listed when an object code module contains them. The output from a lister of the known type for the assembled source code above would be as follows:

0000000000000000 0000006C NOP 0000000000000004 0000006C NOP 0000000000000008 200800CC MOVI #2, R2

000000000000000C 300C 00CC MOVI #3, R3

0000000000000010 0000006C NOP 0000000000000014 0000006C NOP 0000000000000018 100400CC MOVI #1, R1

As can be seen, none of the Assembler Directives in the above sequence have been dissembled. In the case of the conditional Assembler Directives it is thus extremely difficult to determine where each alternative sequence of operations or instructions occurs.

Figure 6:
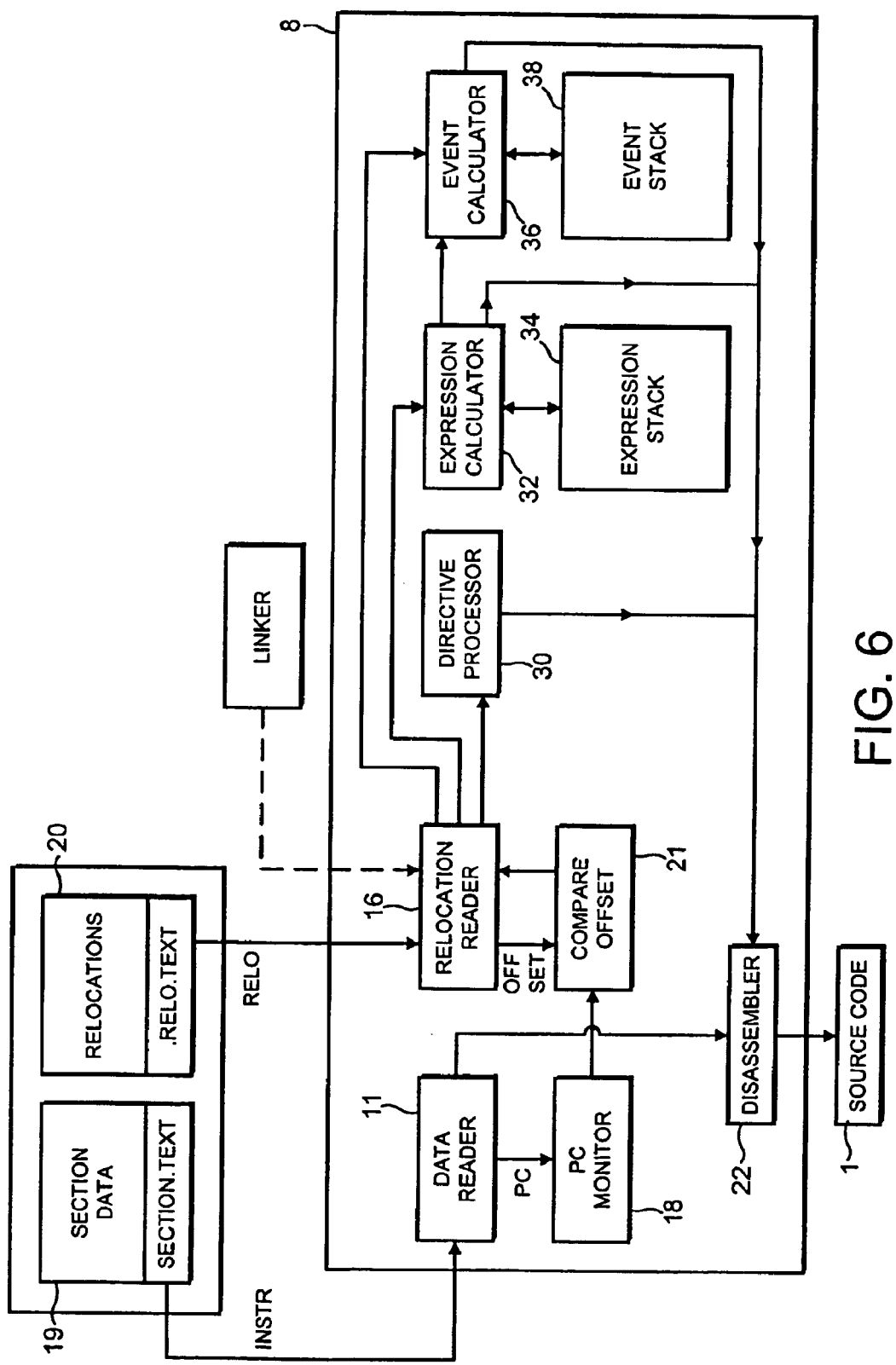
FIG. 6 is a schematic block diagram of components of a lister.

FIG. 6 shows in schematic form a lister according to one embodiment of the present invention. It will be appreciated that in practice the lister can be constituted by a suitably programmed microprocessor. It will be understood therefore that the schematic blocks shown in FIG. 6 are for the purposes of explaining the functionality of the lister. FIG. 6 shows schematically an object code module 3 which includes a section data block 19 and a relocation block 20. This section data 10 is the assembled instructions/operations contained in the original source code module. As illustrated in FIG. 5, the section data is arranged into discrete portions of object code, each portion being identified by a section name. For example, a section of object code may be identified as text. Each portion of section data may have a corresponding relocation section, identified by the same name as the section data. So the relocation section corresponding to text may be identified as relo.text. In a final executable program, the code is divided into segments, rather than sections, each with an associated segment name. Relocations may be left in the executable program after linking, if desired.

The lister 8 comprises a data reader 11 for reading the section data 19 and a relocation reader 16 for reading the relocations 20. The lister also comprises a directive processor 30, an expression calculator 32, an expression stack 34, an event calculator 36 and an event stack 38, the function and operation of which will be explained further below. A program count (PC) monitor 18 monitors the program count of each instruction or operation in the section data, and from this can derive the offset within the relevant section at which the instruction or operation is located. This PC offset, together with the section/segment name, enables the lister to determine the relocation associated with a specific instruction in the section data. This offset value is supplied to an offset comparator 21 which also receives the offset values define in the relocations from the relocation reader 16. The lister 8 also includes a disassembler 22 which implements the disassembler program 10 and which receives instructions/operations from the data reader 11. The lister 12 acts on each portion of section data in turn. Each line of object code is read by the data reader 11 with the program count for that line being fed to the PC monitor 18. The offset within the section data represented by that program count is derived by the PC monitor 18 and supplied to the offset comparator 21. The relocation reader 16 reads the relocation section (in this case .relo.text) and supplied the offsets identified in the relocations to the offset comparator 21. Any relocations which have the same offset as the offset supplied by the PC monitor 18 are processed by the relocation reader 16 to determine if the relocations are directive, expression or indicative of an event. If no relocation is associated with the instruction/operation in the line which has been read by the data reader 11, the disassembler 22 carries out a conventional disassembling operation to generate the equivalent source code instruction. If a relocation is found to be associated with the instruction/operation in the line of object code, the relocation is passed to either the directive processor 30, the expression calculator 32 or the event calculator 36, depending on the "type" of relocation determined by the relocation reader 16. Relocation types include operand relocations (e.g. R-PUSH <label>) and operator relocations (e.g. R__ADD), which are supplied to the expression calculator 32 and directive relocations (e.g. R__IF) which are supplied to the directive processor 30. In the case of operator and operand relocations, the original expression is reconstructed from the information in the relocations. Alternatively, an error might be flagged when the relocation is processed. In addition there are separate event relocations R__ASSERT, which flag events and are supplied to the event calculator 36. These events may be, for example, errors, warnings or information carrying messages defined by the user. That original expression can then be used in the source code listing 1.

The lister 8 can take as its input a final executable program 5 instead of an object code module 3. At link time, the relocations can be left in the final executable program, or removed from it. If they are left in, the lister can operate as already described.

Figure 7A:
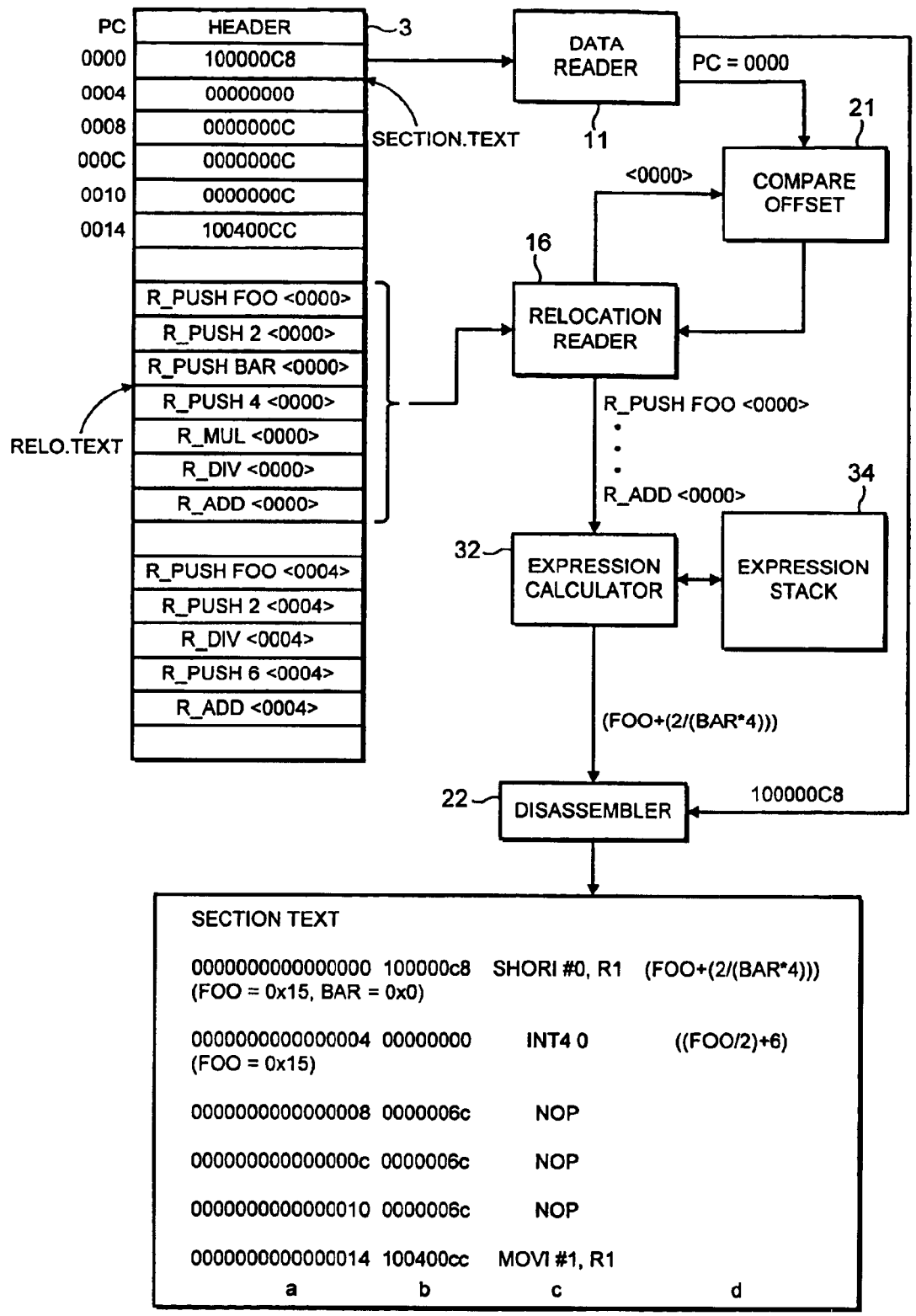
FIG. 7a is a schematic diagram of operation of the lister to deal with relocations implementing arithmetical operations.
Figure 7B:
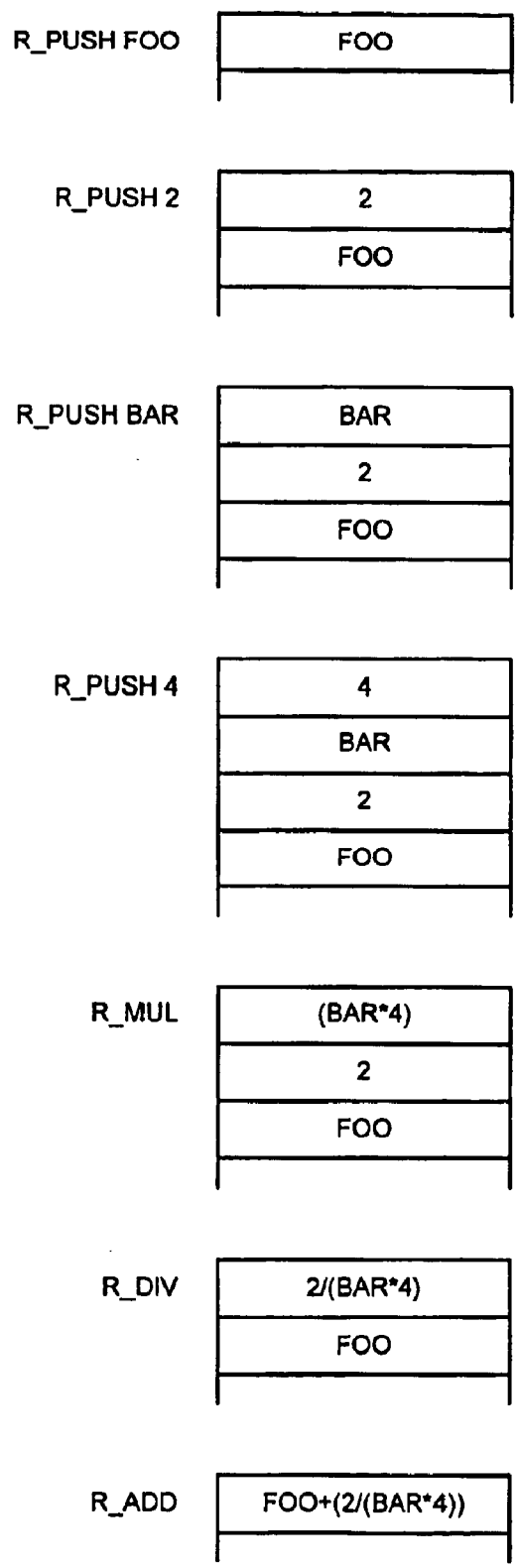

FIG. 7a illustrates the application of the lister 8 in a situation where the disassembled expression in the source code hides the original expression which was used to derive a value. FIG. 7a illustrates the example discussed above. FIG. 7a illustrates the object code module 3 with the section data section.text and the associated relocation section .relo.text. The section data includes the code sequence discussed above in example 1. It is illustrated in FIG. 7a together with the program count for each code line. The first instruction at program count 0000 is associated with the set of relocations discussed above and illustrated in FIG. 7a at offset <0000>. When the first instruction at program count 0000 is read by the data reader 11, its offset is supplied to the offset comparator 21. The offset of the relocations read from the relocation section .relo.text are also supplied to the offset comparator 21. Those relocations which have an offset 0000 are further processed by the relocation reader 16, which in this example determines that the relocations should be supplied to the expression calculator 32. The relocations which have an offset 0000 are supplied in turn to the expression calculator 32 which performs the specified instruction using the expression stack 34. The expression stack 34 holds the actual expressions which are built up from the individual relocations, rather than the resulting value of the expression FIG. 7b illustrates the contents of the expression stack 34 as the expression calculator processes the relocations having an offset 0000 shown in FIG. 7a. Thus, when the all the relocations at offset 0000 have been processed the top of the expression stack 34 contains the original expression. This is then retrieved by the expression calculator 32 and supplied to the disassembler 22 together with the first instruction 10000C8. The resulting display is shown at the bottom of FIG. 7a consisting of the program count A, the hexadecimal assembled object code B, the disassembled instruction in source code corresponding to the hexadecimal object code (and including the final value 0 in the first instruction) and the expressions, d, which is used to calculate the value of 0 in the first instruction, derived from the relocation data by the expression calculator and expression stack.

The example of FIG. 7a similarly illustrates the same sequence with respect to the second instruction at program count 0004.

Figure 8:
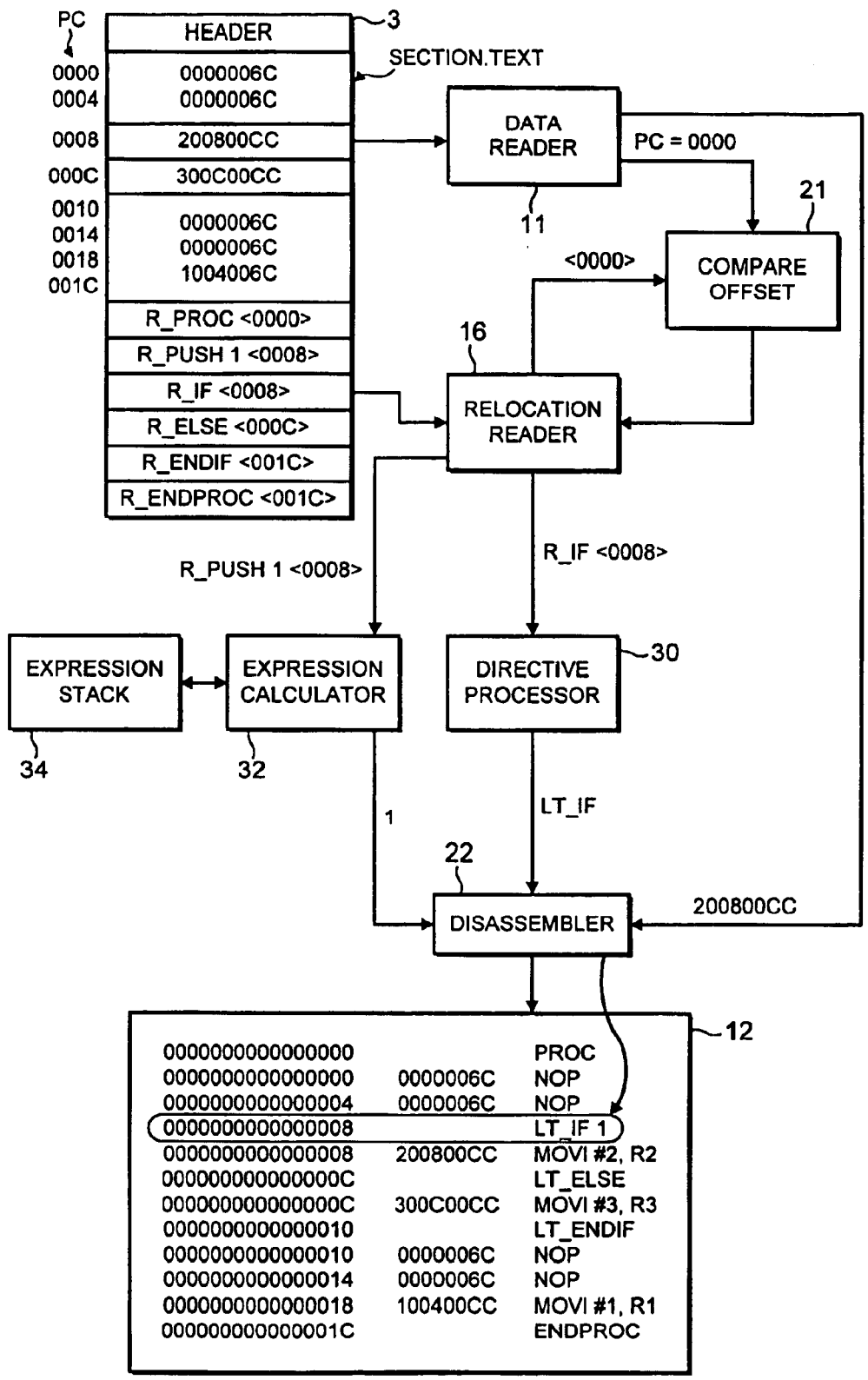
FIG. 8 is a schematic diagram illustrating the operation of a lister for the generation of assembler directives responsive to relocations for directives.

FIG. 8 illustrates how the lister operates to deal with the second example discussed above. An object code module 3 contains the code sequence discussed above in relation to example 2. In line with FIG. 5, the object code module includes a plurality of alternative code sequences, denoted O1,O2 in FIGS. 5 and 8. In this particular example, each code sequence is a single line of code, although it will readily be appreciated that a plurality of lines of code could be provided for each alternative code sequence. The relocation section is shown to include three conditional relocations R__IF, R__ELSE and R__ENDIF attached to the appropriate offsets for the optional code lines in the section data. When the first optional code line O1 at program count 0008 is read by the data reader 11, the relocations reader determines that a conditional relocation R__IF is present at the same offset, and supplies the relocation to the directive processor 30. The directive processor uses this information to regenerate the conditional assembler directive which gave rise to the conditional relocation. The conditional assembler directive and the instruction at program count 0008 are supplied to the disassembler. Because conditional assembler directives are not executable instructions themselves (that is they do not themselves form part of the executable program), when the source code containing the conditional assembler directives is assembled, the program counter is not incremented. Thus, the conditional assembler directive is displayed with a program count corresponding to that of the original optional code line. The same procedure is carried out for the optional code line O2 at program count 0000C and also for the ending code line at program count 0010 which is likewise found to have a final conditional relocation R__ENDIF at that offset.

Figure 9:
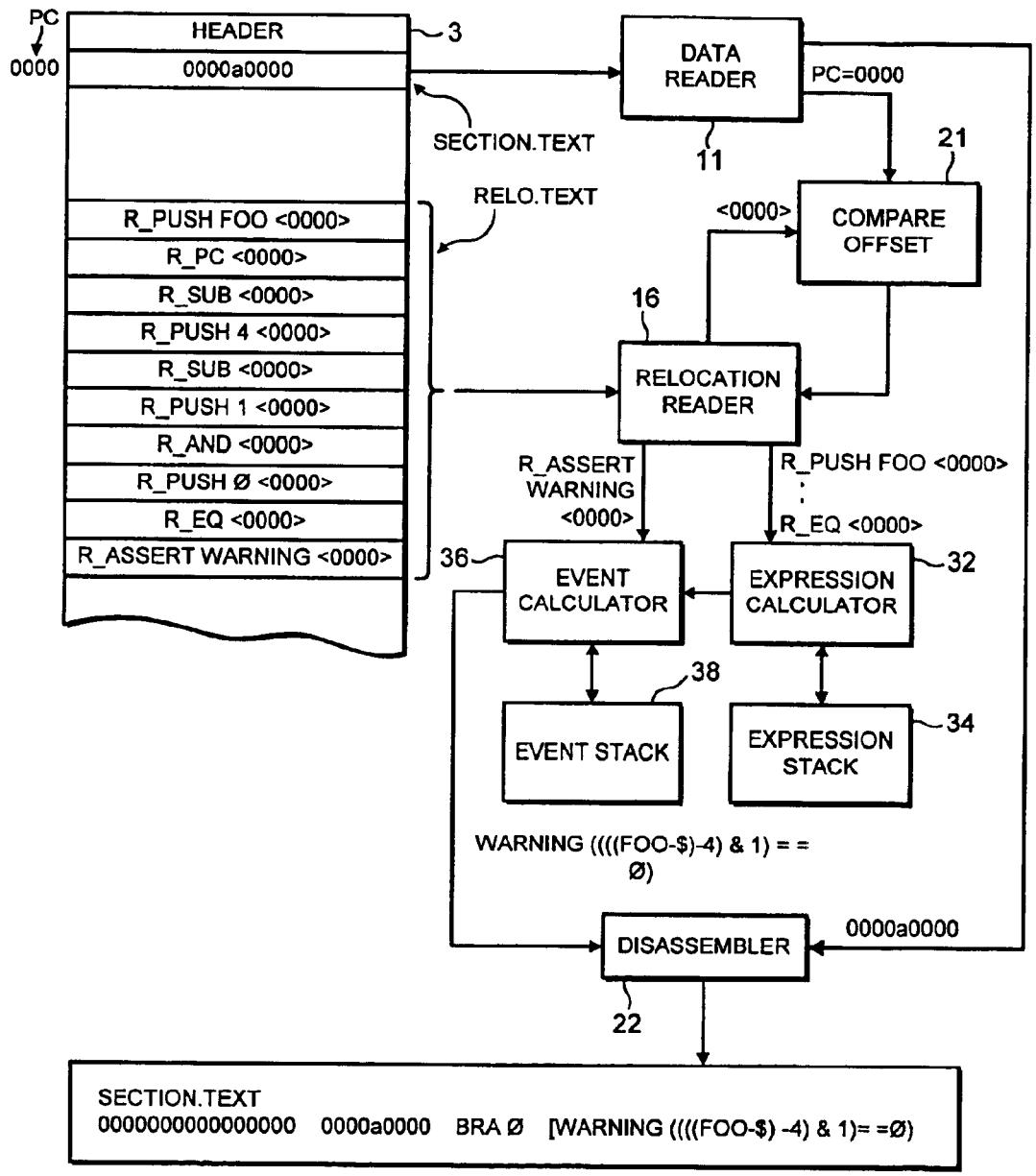
FIG. 9 is an illustration of the operation of a lister to deal with event relocations.

FIG. 9 illustrates how the lister operates to deal with events generated in response to event relocations. Each instruction within a data section of the executable program may have one or more events associates with it, denoted by the symbol Ø where Ø can take any value of integer from 1 to n. In the example illustrated in FIG. 9 the instruction BARØ at program count 0000 is associated with the event "WARNING((((FOO-$)-4)&1)==Ø)", where $ represents the program count. Initially the operation of the lister is the same as that described in relation to FIGS. 7a and 7b. The relocation reader 16 supplies the expression relocations R__PUSH to R__EQ having the same offset as the instruction to the expression calculator 32 which, using the expression stack 34 regenerates the initial expression. However when the event relocation R__ASSERT WARNING is received by the relocation reader 16 it is supplied to the event calculator 36. The event calculator retrieves the expression from the top of the expression stack 34, generates the event "WARNING((((FOO-$)4)&1)==Ø)", and places this on top of the event stack 38. If any further events are associated with the same instruction these are then processed in turn and also placed on the event stack 38 so that when all the events have been processed the event stack 38 will hold Ø events. When it is detected that there are no more events associated with an instruction (determined by the relocation offset changing value), the events are popped from the event stack 38 and supplied to the disassembler 22 together with the original instruction 0000a000.

In the above description it has been assumed that the program count in the object code module is the same as the offset identified in the respective relocation. In fact however it will readily be appreciated that the offset identified in the relocation can be taken from an index value representing the base of the object code module or the base of the particular section. Thus, the offset identified in the relocation merely allows the correct location in the section data to be identified and need not be identical to the program count itself.

What is claimed is:

1. A method of generating a source code listing from an object code sequence comprising section data including a plurality of program instructions, said section data having associated therewith a relocation section including at least one relocation instruction denoting a link time modification to an original object code sequence and its expressions/values to generate an executable program, the method comprising:

for each location in the section data determining if that location in said section data has a relocation instruction associated with it;

reading said associated relocation instruction and deriving from the relocation instruction the expressions/values of the original object code sequence lost due to the link time modification; and generating the source code listing for that location in the section data, the source code listing comprising the source code from which the object code at that location was derived with said expressions/values of the original object code sequence derived from the relocation instruction.

2. A method according to claim 1, comprising displaying the source code listing in a humanly readable form.

3. A method according to claim 1, wherein said object code sequence forms part of an object code module.

4. A method according to claim 1, wherein said code sequence forms part of an executable program.

5. A method according to claim 1, wherein the object code sequence forms part of a library object code module holding a number of frequently used code sequences together with their associated relocations.

6. A method according to claim 1, wherein said relocation section comprises a plurality of relocation instructions for performing calculations using a stack.

7. A method according to claim 6, wherein said relocation instructions are read sequentially to derive said expressions/values of the original object code sequence lost due to the link time modification, the expressions/values comprising an arithmetic expression which was defined in the original source code but not in the object code sequence.

8. A method according to claim 1, which comprises the step of generating assembler directives in said source code corresponding to relocation instructions in the relocation section.

9. A method according to claim 1, wherein the expressions/values of the original object code sequence lost due to the link time modification is operand values defined in the original source code but not in the object code sequence.

10. A method according to claim 1, wherein the expressions/values of the original object code sequence lost due to the link time modification is event information for the original source code derived from the relocation instructions.

11. A lister for generating a source code listing from an object code sequence comprising a plurality of program instructions, at least one of said program instructions having an associated relocation instruction denoting a link time modification to an original object code sequence and its expressions/values to generate an executable program, the lister comprising:

an instruction reader for reading each said program instruction;

a relocation reader for reading said relocation instructions;

a relocation identifier for determining for each program instruction whether there is an associated relocation instruction; and a disassembler module for disassembling said program instructions received from said instruction reader to generate source code and for deriving from said relocation instruction the expressions/values of the original object code sequence lost due to the link time modification, wherein said source code can be displayed in human readable form.

12. A lister according to claim 11, further comprising a program count detector for detecting the program count value for each program instruction and offset determining means for determining an offset identified in each relocation instruction to determine if the relocation instruction is associated with the program instruction.

13. A lister according to claim 11, wherein said relocation reader is operable to determine the type of relocation instruction being read.

14. A lister according to claim 13, wherein the types of relocation include an operand relocation; an operator relocation; an event relocation; and a directive relocation.

15. A lister according to claim 11 which comprises an expression calculator for calculating expressions generated from the relocation instructions as the expressions/values of the original object code sequence lost due to the link time modification.

16. A lister according to claim 15, which comprises an expression stack for holding said calculated expressions.

17. A lister according to claim 11, which comprises an event calculator for identifying events associated with an instruction from said relocation instructions as the expressions/values of the original object code sequence lost due to the link time modification.

18. A lister according to claim 17, which comprises an event stack for holding said identified events.

19. A lister according to claim 11, which comprises a directive processor which generates assembler directives derived from the relocation instructions as the expressions/values of the original object code sequence lost due to the link time modification.

20. A method of generating a source code listing from an object code sequence comprising section data including a plurality of program instructions, said section data having associated therewith a relocation section including at least one relocation instruction denoting a link time modification to an original object code sequence and its expressions/values to generate an executable program, the method comprising:

for each location in the section data determining if that location in said section data has a relocation instruction associated with it;

reading said associated relocation instruction for determining an operand, operator, event and/or directive relocation type of relocation instruction and deriving from the determined type of relocation instruction original object code sequence expressions/values; and generating the source code listing for that location in the section data, the source code listing comprising the source code from which the object code at that location was derived with said original object code sequence expressions/values derived from the relocation instruction type.

21. A lister for generating a source code listing from an object code sequence comprising a plurality of program instructions, at least one of said program instructions having an associated relocation instruction denoting a link time modification to an original object code sequence and its expressions/values to generate an executable program, the lister comprising:

an instruction reader for reading each said program instruction;

a relocation reader for reading said relocation instructions and determining an operand, operator, event and/or directive relocation type of relocation instruction being read;

a relocation identifier for determining for each program instruction whether there is an associated relocation instruction; and a disassembler module for disassembling said program instructions received from said instruction reader to generate source code and for deriving from said relocation instruction type the original object code sequence expressions/values, wherein said source code can be displayed in human readable form.

* * * * *

UNITED STATES PATENT AND TRADEMARK OFFICE
CERTIFICATE OF CORRECTION

PATENT NO. : 6,886,156 B2 Page 1 of 1
APPLICATION NO. : 09/727327
DATED : April 25, 2005
INVENTOR(S) : Marian MacCormack It is certified that error appears in the above-identified patent and that said Letters Patent is hereby corrected as shown below:

TITLE PAGE, ITEM [75] INVENTOR

Replace                 "McCormack" with --MacCormack--

IN COLUMN 1, LINE 38

Replace                 "abc" with --.abc--

IN COLUMN 8, LINE 14

Insert                   and additional --0-- preceding "0000006C"

COLUMN 8, LINE 41

Replace                 "text" with --.text--

COLUMN 8, LINE 44

Replace                 "text" with --.text--

COLUMN 10, LINE 64

Replace                 "WARNING((((FOO-$)4)&1)==Ø)" with --WARNING((((FOO-$)-4)&1)==Ø)--

Signed and Sealed this

Eighth Day of May, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,886,156 B2 | Page 1 of 1 |
| APPLICATION NO. | : 09/727327 | |
| DATED | : April 26, 2005 | |
| INVENTOR(S) | : Marian MacCormack | |

It is certified that error appears in the above-identified patent and that said Letters Patent is hereby corrected as shown below:

TITLE PAGE, ITEM [75] INVENTOR

Replace                          "McCormack" with --MacCormack--

IN COLUMN 1, LINE 38

Replace                          "abc" with --.abc--

IN COLUMN 8, LINE 14

Insert                              and additional --0-- preceding "0000006C"

COLUMN 8, LINE 41

Replace                          "text" with --.text--

COLUMN 8, LINE 44

Replace                          "text" with --.text--

COLUMN 10, LINE 64

Replace                          "WARNING((((FOO-$)4)&1)==Ø)" with --WARNING((((FOO-$)-4)&1)==Ø)--

This certificate supersedes Certificate of Correction issued May 8, 2007.

Signed and Sealed this

Twenty-ninth Day of May, 2007

JON W. DUDAS
*Director of the United States Patent and Trademark Office*